United States Patent
Ikegami

(10) Patent No.: US 9,762,477 B2
(45) Date of Patent: Sep. 12, 2017

(54) NETWORK APPARATUS WITH LOOP DETECTION AND PORT SHUTDOWN CAPABILITIES

(71) Applicant: ALLIED TELESIS HOLDINGS K.K., Shinagawa-ku, Tokyo (JP)

(72) Inventor: Tokunori Ikegami, Tokyo (JP)

(73) Assignee: ALLIED TELESIS HOLDINGS K.K., Tokyo (JP)

( * ) Notice: Subject to any disclaimer, the term of this patent is extended or adjusted under 35 U.S.C. 154(b) by 218 days.

(21) Appl. No.: 14/741,945

(22) Filed: Jun. 17, 2015

(65) Prior Publication Data

US 2016/0006647 A1    Jan. 7, 2016

(30) Foreign Application Priority Data

Jul. 4, 2014 (JP) ................. 2014-138577

(51) Int. Cl.
*H04L 12/705* (2013.01)
(52) U.S. Cl.
CPC .................. *H04L 45/18* (2013.01)
(58) Field of Classification Search
CPC ....................................................... H04L 45/18
USPC ........................................................ 370/254
See application file for complete search history.

(56) References Cited

U.S. PATENT DOCUMENTS

| | | | |
|---|---|---|---|
| 6,628,624 B1 * | 9/2003 | Mahajan | H04L 12/462 370/252 |
| 7,706,258 B2 * | 4/2010 | Elie-Dit-Cosaque | H04L 45/00 370/222 |
| 7,969,895 B2 | 6/2011 | Kamachi et al. | |
| 8,139,584 B2 | 3/2012 | Suzuyama et al. | |
| 8,553,565 B2 | 10/2013 | Kamachi et al. | |
| 2009/0207742 A1 * | 8/2009 | Suzuyama | H04L 12/462 370/249 |

(Continued)

FOREIGN PATENT DOCUMENTS

| | | |
|---|---|---|
| JP | 11-191782 | 7/1999 |
| JP | 2006-238305 | 9/2006 |

(Continued)

OTHER PUBLICATIONS

U.S. Appl. No. 14/748,698 to Tokunori Ikegami, filed Jun. 24, 2015.

*Primary Examiner* — Stephen J Clawson
(74) *Attorney, Agent, or Firm* — Greenblum & Bernstein, P.L.C.

(57) ABSTRACT

According to the present invention, a network device includes a plurality of ports, a communication controller that controls communication on the each port, and a communication shutoff unit that shuts off communication on any of the ports. The communication controller includes a linkup detection unit that detects a linkup of the each port, a loop detection frame sending unit that sends a loop detection frame from a linkup detected port, which is a port for which the linkup is detected after a predetermined period from a time point when the linkup is detected by the linkup detection unit, and a loop detection frame detection unit that detects the loop detection frame if the loop detection frame is received on the each port. The communication shutoff unit shuts off communication carried out on a sending port which is a port from which the detected loop detection frame is sent.

10 Claims, 12 Drawing Sheets

(56) References Cited

U.S. PATENT DOCUMENTS

| | | |
|---|---|---|
| 2009/0219821 A1 | 9/2009 | Kamachi et al. |
| 2011/0134760 A1 | 6/2011 | Kamachi et al. |
| 2015/0016473 A1* | 1/2015 | Wakabayashi .......... H04L 69/22 370/474 |

FOREIGN PATENT DOCUMENTS

| | | |
|---|---|---|
| JP | 2009-117889 | 5/2009 |
| JP | 2009-117899 | 5/2009 |
| JP | 2009-194752 | 8/2009 |
| JP | 2009-207028 | 9/2009 |

* cited by examiner

NETWORK APPARATUS WITH LOOP DETECTION AND PORT SHUTDOWN CAPABILITIES

BACKGROUND OF THE INVENTION

1. Field of the Invention

The present invention relates to dissolution of a loop relating to a network device (such as a switch).

2. Related Art

When a network device is connected incorrectly, a loop may be generated.

FIGS. 11(a) and 11(b) are diagrams showing an example of a network configuration in which a loop is generated according to prior art, and showing an example (FIG. 11(a)) of the network configuration before a loop is generated and an example (FIG. 11(b)) of the network configuration after the loop is generated.

Referring to FIG. 11(a), a port 101 of the switch 100 and a port 201 of a hub 200 are correctly connected with each other. It should be noted that the switch 100 includes ports 102 and 103 in addition to the port 101, and the hub 200 includes ports 202 and 203 in addition to the port 201.

However, referring to FIG. 11(b), the port 103 of the switch 100 and the port 203 of the hub 200 are incorrectly connected with each other. In this case, a loop is generated.

For example, a frame output (broadcasted) from the port 101 is output via the port 201 and the hub 200 from the port 203. Further, the frame output from the port 203 is output via the port 103 and the switch 100 from the port 101.

For example, a frame output (broadcasted) from the port 103 is output via the port 203 and the hub 200 from the port 201. Further, the frame output from the port 201 is output via the port 101 and the switch 100 from the port 103.

When a loop is generated in this way, a communication is interfered. It is thus known that a loop is detected by means of a loop detection frame (LDF), thereby dissolving the loop.

FIGS. 12(a) and 12(b) are diagrams showing a detection principle of a loop by means of the LDF according to prior art, and shows a case in which the LDF is output from the port 101 (FIG. 12(a)), and a case in which the LDF is output from the port 103 (FIG. 12(b)).

Referring to FIG. 12(a), when the LDF is output from the port 101, the LDF is output via the port 201 and the hub 200 from the port 203. Further, the LDF output from the port 203 is received at the port 103.

Referring to FIG. 12(b), when the LDF is output from the port 103, the LDF is output via the port 203 and the hub 200 from the port 201. Further, the LDF output from the port 201 is received at the port 101.

On this occasion, while the LDF is periodically (such as at an interval of 1 second) output from the each port of the switch 100, and if the LDF is detected at any port of the switch 100, it can be determined that a loop is generated. If the switch 100 determines that a loop is generated, the loop can be dissolved by shutting off a communication on a port (at least one port of ports 101 and 103) relating to the loop generation.

PRIOR ART DOCUMENTS

[Patent Document 1] JP 2009-194752 A
[Patent Document 2] JP 2009-207028 A
[Patent Document 3] JP 2009-117889 A
[Patent Document 4] JP 2006-238305 A
[Patent Document 5] JP Hei11(1999)-191782A

SUMMARY OF THE INVENTION

However, if the switch 100 is configured to shut off the communication on the ports (at least one of the ports 101, and 103) relating to the loop generation, the communication on the ports 101 and 103 can be shut off, or the communication on the port 101 can be shut off.

If the communication on the ports 101 and 103 is shut off, the communication between the switch 100 and the hub 200 cannot be carried out.

If the communication on the port 101 is shut off, the communication between the switch 100 and the hub 200 is carried out via the port 103. However, setting for the communication on the port 103 connected incorrectly may be different from setting for the communication on the port 101 connected correctly. Therefore, the communication via the port 103 is not guaranteed.

It is therefore an object of the present invention to enable communication on a port correctly connected between network devices when a loop is dissolved.

According to the present invention, a network device including a plurality of ports, includes: a communication controller that controls communication on the each port; and a communication shutoff unit that shuts off communication on any of the ports, wherein: the communication controller includes: a linkup detection unit that detects a linkup of the each port; a loop detection frame sending unit that sends a loop detection frame from a linkup detected port, which is a port for which the linkup is detected after a predetermined period from a time point when the linkup is detected by the linkup detection unit; and a loop detection frame detection unit that detects the loop detection frame if the loop detection frame is received on the each port; and the communication shutoff unit shuts off communication carried out on a sending port which is a port from which the detected loop detection frame is sent.

According to the thus constructed network device, a network device including a plurality of ports, including: a communication controller that controls communication on the each port; and a communication shutoff unit that shuts off communication on any of the ports, can be provided. The communication controller includes: a linkup detection unit, a loop detection frame sending unit and a loop detection frame detection unit. The linkup detection unit detects a linkup of the each port. The loop detection frame sending unit sends a loop detection frame from a linkup detected port, which is a port for which the linkup is detected after a predetermined period from a time point when the linkup is detected by the linkup detection unit. The loop detection frame detection unit detects the loop detection frame if the loop detection frame is received on the each port. The communication shutoff unit shuts off communication carried out on a sending port which is a port from which the detected loop detection frame is sent.

According to the network device of the present invention, the predetermined period may be set by a user of the network device.

According to the network device of the present invention, the predetermined period may be 0.

According to the network device of the present invention, another network device may be connected to the network device; and the predetermined period may be longer than a difference between a period required for detecting the linkup of the network device and a period required for detecting the linkup of the other network device.

According to the network device of the present invention, communication on the linkup detected port may be shut off from a time point before the linkup is detected on the other network device until the loop detection frame is sent from the network device.

According to the network device of the present invention, communication on the linkup detected port may be shut off from a time point when the linkup is detected on the network device until the loop detection frame is sent from the network device.

According to the network device of the present invention, the sending port may be recorded in the loop detection frame.

According to the network device of the present invention, the sending port may be recorded in the network device.

The present invention is a communication method with using a network device having a plurality of ports, a communication controller that controls communication on the each port, and a communication shutoff unit that shuts off communication on any of the ports, the method including: a linkup detection step that detects a linkup of the each port; a loop detection frame sending step that sends a loop detection frame from a linkup detected port, which is a port for which the linkup is detected after a predetermined period from a time point when the linkup is detected by the linkup detection step; a loop detection frame detection step that detects the loop detection frame if the loop detection frame is received on the each port; and a communication shutoff step that shuts off communication carried out on a sending port which is a port from which the detected loop detection frame is sent.

The present invention is a program of instructions for execution by a computer to perform a communication process with using a network device having a plurality of ports, a communication controller that controls communication on the each port, and a communication shutoff unit that shuts off communication on any of the ports, the process including: a linkup detection step that detects a linkup of the each port; a loop detection frame sending step that sends a loop detection frame from a linkup detected port, which is a port for which the linkup is detected after a predetermined period from a time point when the linkup is detected by the linkup detection step; a loop detection frame detection step that detects the loop detection frame if the loop detection frame is received on the each port; and a communication shutoff step that shuts off communication carried out on a sending port which is a port from which the detected loop detection frame is sent.

The present invention is a computer-readable medium having a program of instructions for execution by a computer to perform a communication process with using a network device having a plurality of ports, a communication controller that controls communication on the each port, and a communication shutoff unit that shuts off communication on any of the ports, the process including: a linkup detection step that detects a linkup of the each port; a loop detection frame sending step that sends a loop detection frame from a linkup detected port, which is a port for which the linkup is detected after a predetermined period from a time point when the linkup is detected by the linkup detection step; a loop detection frame detection step that detects the loop detection frame if the loop detection frame is received on the each port; and a communication shutoff step that shuts off communication carried out on a sending port which is a port from which the detected loop detection frame is sent.

DESCRIPTION OF EMBODIMENTS

A description will now be given of an embodiment of the present invention referring to drawings.

Figure 1:
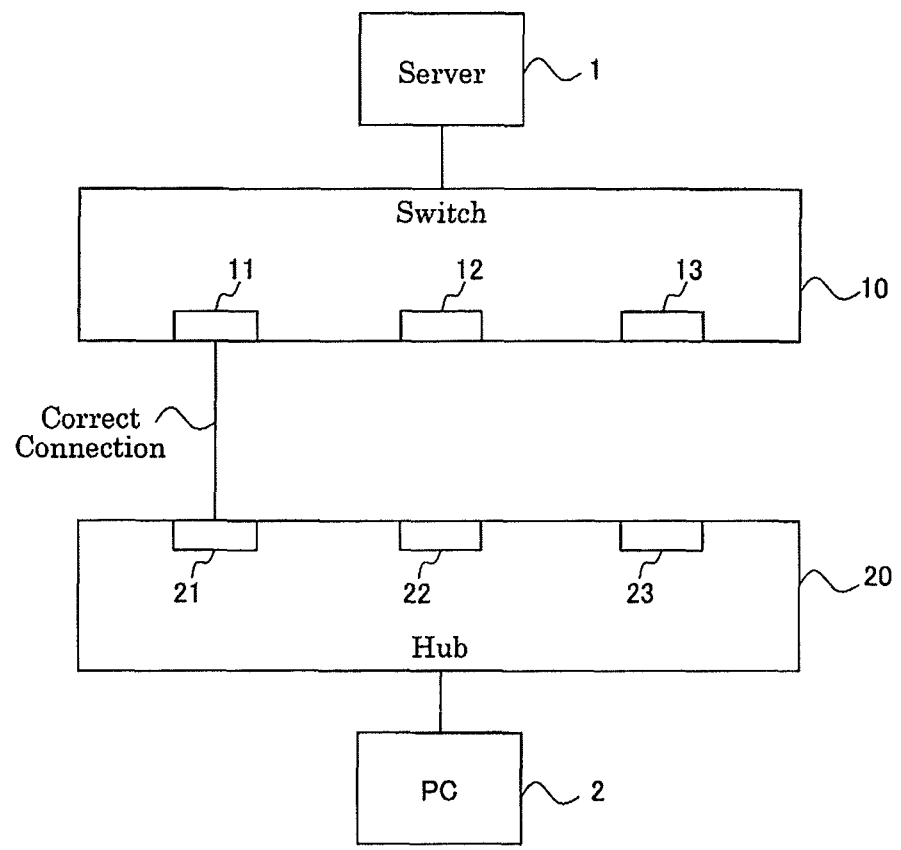
FIG. 1 is a diagram showing a network configuration if a switch 10 according to an embodiment of the present invention is correctly connected to a hub 20.

FIG. 1 is a diagram showing a network configuration if a switch 10 according to an embodiment of the present invention is correctly connected to a hub 20.

The switch (network device) 10 according to the embodiment of the present invention includes a plurality of ports 11, 12, and 13. The hub (another network device) 20 is connected to the switch 10. The hub 20 also includes a plurality of ports 21, 22, and 23. A server 1 is connected to the switch 10, and a PC (personal computer) 2 is connected to the hub 20.

The port 11 of the switch 10 and the port 21 of the hub 20 are connected with each other via a well-known communication cable (such as 1000BASE-T cable). This connection enables correct communication between the server 1 and the PC 2 via the switch 10 and the hub 20. On this occasion the connection between the port 11 and the port 21 is referred to as "correct connection".

It should be noted that a connection port of the switch 10 to the server 1 and a connection port of the hub 20 to the PC 2 are omitted in FIG. 1.

Figure 2:
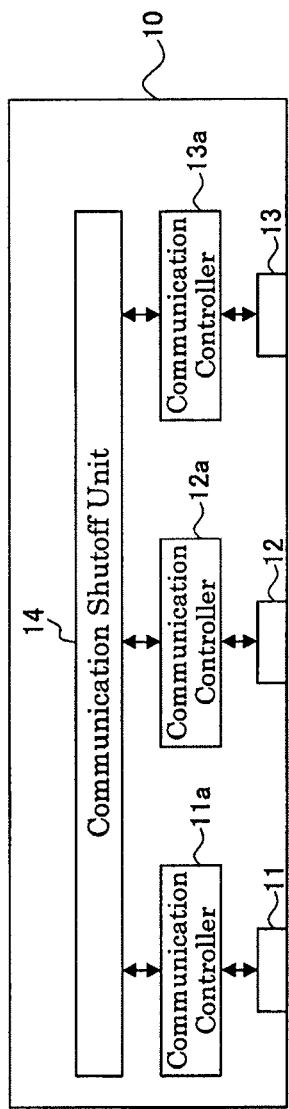
FIG. 2 is a functional block diagram showing a configuration of the switch 10 according to the embodiment of the present invention.

FIG. 2 is a functional block diagram showing a configuration of the switch 10 according to the embodiment of the present invention.

The switch 10 includes communication controllers 11a, 12a, and 13a and a communication shutoff unit 14.

The communication controllers 11a, 12a, and 13a control communication on the respective ports 11, 12, and 13. The communication controller 11a is connected to the port 11 to control the communication on the port 11. The communication controller 12a is connected to the port 12 to control the communication on the port 12. The communication controller 13a is connected to the port 13 to control the communication on the port 13.

The communication shutoff unit 14 shuts off the communication on any of the ports 11, 12, and 13.

It should be noted that the connection port of the switch 10 to the server 1 and mutual communication of data among communication controllers 11a, 12a, and 13a are omitted in FIG. 2.

Figure 3:
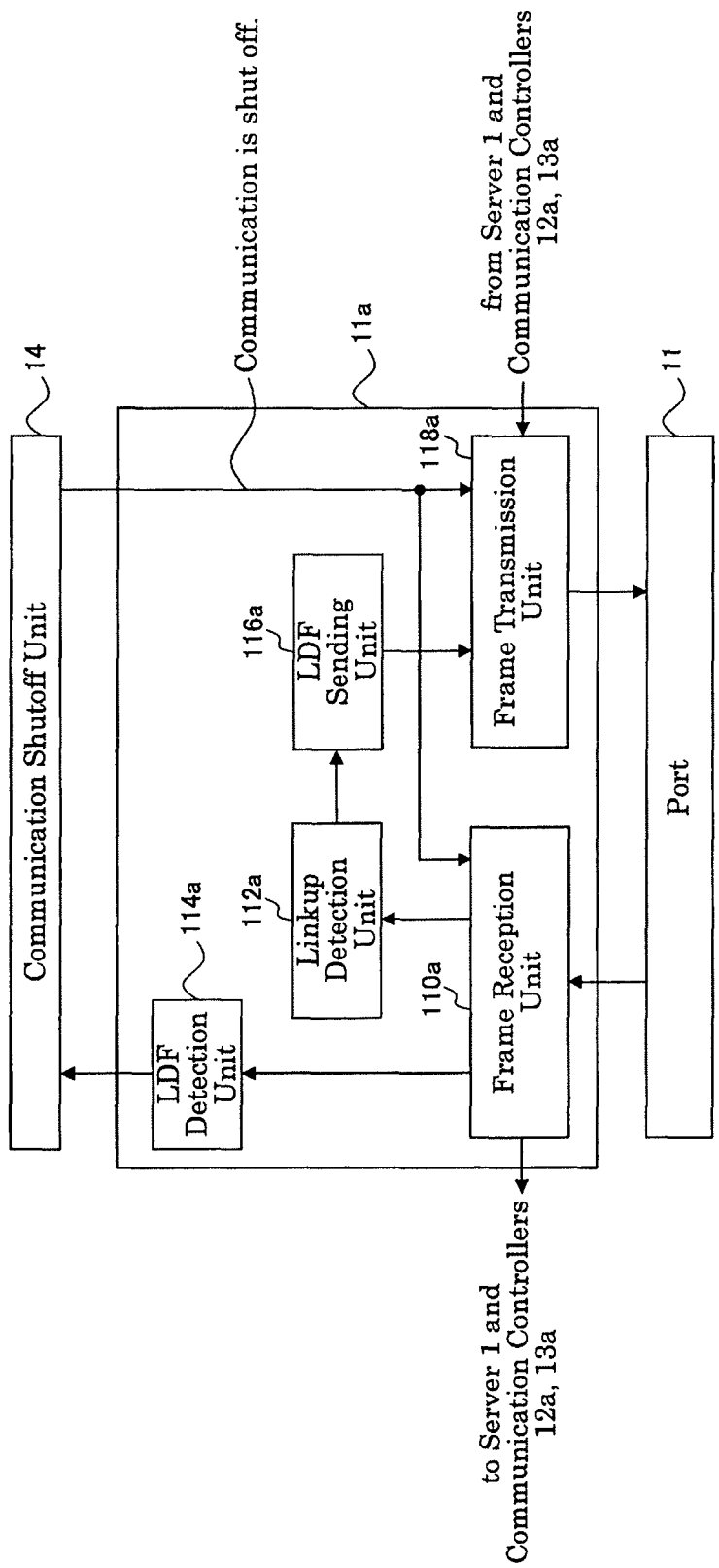
FIG. 3 is a functional block diagram showing a configuration of the communication controller 11a included by the switch 10 according to the embodiment of the present invention.

FIG. 3 is a functional block diagram showing a configuration of the communication controller 11a included by the switch 10 according to the embodiment of the present invention.

The communication controller 11a includes a frame reception unit 110a, a linkup detection unit 112a, a loop detection frame detection unit 114a, a loop detection frame sending unit 116a, and a frame transmission unit 118a.

The frame reception unit 110a receives a frame via the port 11. It should be noted that if a destination of the frame is the server 1, the frame reception unit 110a forwards the frame toward the server 1. Moreover, if the destination of the frame is the communication controller 12a, the frame reception unit 110a forwards the frame toward the communication controller 12a. Further, if the destination of the frame is the communication controller 13a, the frame reception unit 110a forwards the frame toward the communication controller 13a. For example, if the frame reception unit 110a receives a broadcasted frame via the port 11, the frame reception unit 110a forwards the frame toward the server 1, the communication controller 12a, and the communication controller 13a.

The linkup detection unit 112a detects a linkup of the port 11. The linkup of the port 11 refers to a state where the port 11 is connected to another network device (such as the hub 20) (via a cable of 1000BASE-T for example), and is brought into a state where the communication is available.

The linkup detection unit 112a reads a frame received by the frame reception unit 110a from the frame reception unit 110a, and, if the frame read from the frame reception unit 110a is a normal link pulse (NLP), detects the linkup of the port 11.

When a predetermined period (refer to Δt in FIG. 7, for example) has elapsed since a time point when the linkup is detected by the linkup detection unit 112a, the loop detection frame sending unit 116a sends a loop detection frame (LDF) from the port 11, which is a linkup detected port, via the frame transmission unit 118a. The loop detection frame may be broadcasted. It should be noted that, though the LDF is mentioned as an example of the loop detection frame, it is only necessary for the loop detection frame to be distinguished from a frame used for ordinary communication.

It should be noted that the linkup detected port is the port on which the linkup is detected. If the linkup is detected by the linkup detection unit 112a, the port 11 is the linkup detected port.

If the loop detection frame detection unit 114a receives the loop detection frame on the port 11, the loop detection frame detection unit 114a detects the loop detection frame.

The loop detection frame detection unit 114a reads the frame received by the frame reception unit 110a from the frame reception unit 110a. If the read frame is the loop detection frame, the loop detection frame detection unit 114a detects the loop detection frame.

A sending port from which the loop detection frame is sent is recorded in the loop detection frame. The loop detection frame detection unit 114a reads the sending port from the loop detection frame, and provides the sending port to the communication shutoff unit 14.

The frame transmission unit 118a transmits a frame (such as a loop detection frame) via the port 11. It should be noted that if the frame transmission unit 118a receives a frame from the server 1, the communication controller 12a, and the communication controller 13a, the frame transmission unit 118a transmits the frame via the port 11.

The communication shutoff unit 14 receives the sending port from the loop detection frame detection unit 114a, and shuts off the communication via the sending port. If the port 11 is a sending port, the reception by the frame reception unit 110a is stopped, and, simultaneously, the transmission by the frame transmission unit 118a is also stopped. It should be noted that the stop of the reception by the frame reception unit 110a includes a case in which a frame is received by the frame reception unit 110a, but the frame is discarded.

Figure 4:
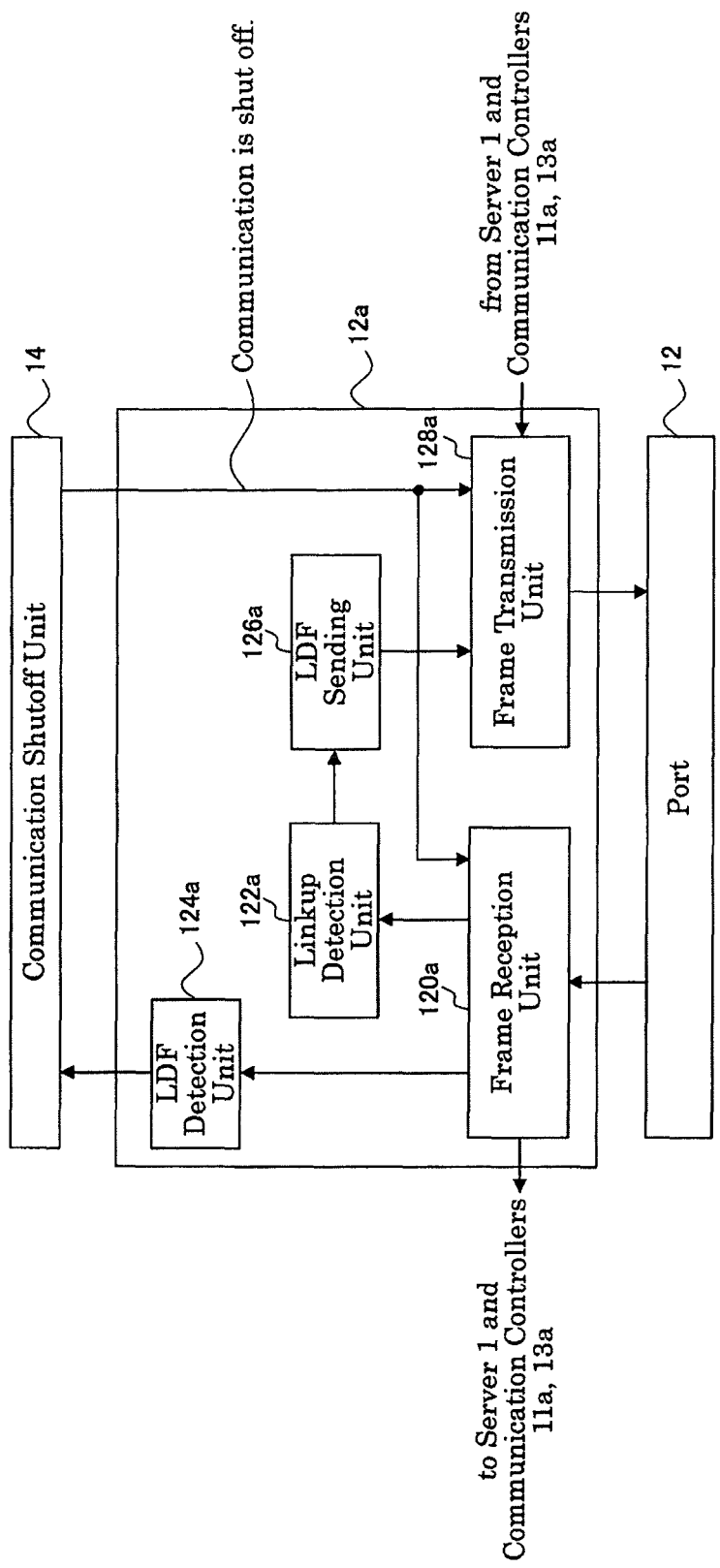
FIG. 4 is a functional block diagram showing a configuration of the communication controller 12a included by the switch 10 according to the embodiment of the present invention.

FIG. 4 is a functional block diagram showing a configuration of the communication controller 12a included by the switch 10 according to the embodiment of the present invention.

The communication controller 12a includes a frame reception unit 120a, a linkup detection unit 122a, a loop detection frame detection unit 124a, a loop detection frame sending unit 126a, and a frame transmission unit 128a.

The frame reception unit 120a, the linkup detection unit 122a, the loop detection frame detection unit 124a, the loop detection frame sending unit 126a, and the frame transmission unit 128a are respectively the same as the frame reception unit 110a, the linkup detection unit 112a, the loop detection frame detection unit 114a, the loop detection frame sending unit 116a, and the frame transmission unit 118a.

It should be noted that the frame reception unit 120a, the linkup detection unit 122a, the loop detection frame detection unit 124a, the loop detection frame sending unit 126a, and the frame transmission unit 128a carry out processing relating to the port 12, which is a point different from the frame reception unit 110a, the linkup detection unit 112a, the loop detection frame detection unit 114a, the loop detection frame sending unit 116a, and the frame transmission unit 118a which carry out processing relating to the port 11.

Moreover, if a destination of the frame is the communication controller 11a, the frame reception unit 120a forwards the frame toward the communication controller 11a. For example, if the frame reception unit 120a receives a broadcasted frame via the port 12, the frame reception unit 120a forwards the frame toward the server 1, the communication controller 11a, and the communication controller 13a.

Further, the frame transmission unit 128*a* transmits a frame (such as a loop detection frame) via the port 12. It should be noted that if the frame transmission unit 128*a* receives a frame from the server 1, the communication controller 11*a*, and the communication controller 13*a*, the frame transmission unit 128*a* transmits the frame via the port 12.

The communication shutoff unit 14 receives the sending port from the loop detection frame detection unit 124*a*, and shuts off the communication via the sending port. If the port 12 is a sending port, the reception by the frame reception unit 120*a* is stopped, and, simultaneously, the transmission by the frame transmission unit 128*a* is also stopped. It should be noted that the stop of the reception by the frame reception unit 120*a* includes a case in which a frame is received by the frame reception unit 120*a*, but the frame is discarded.

Figure 5:
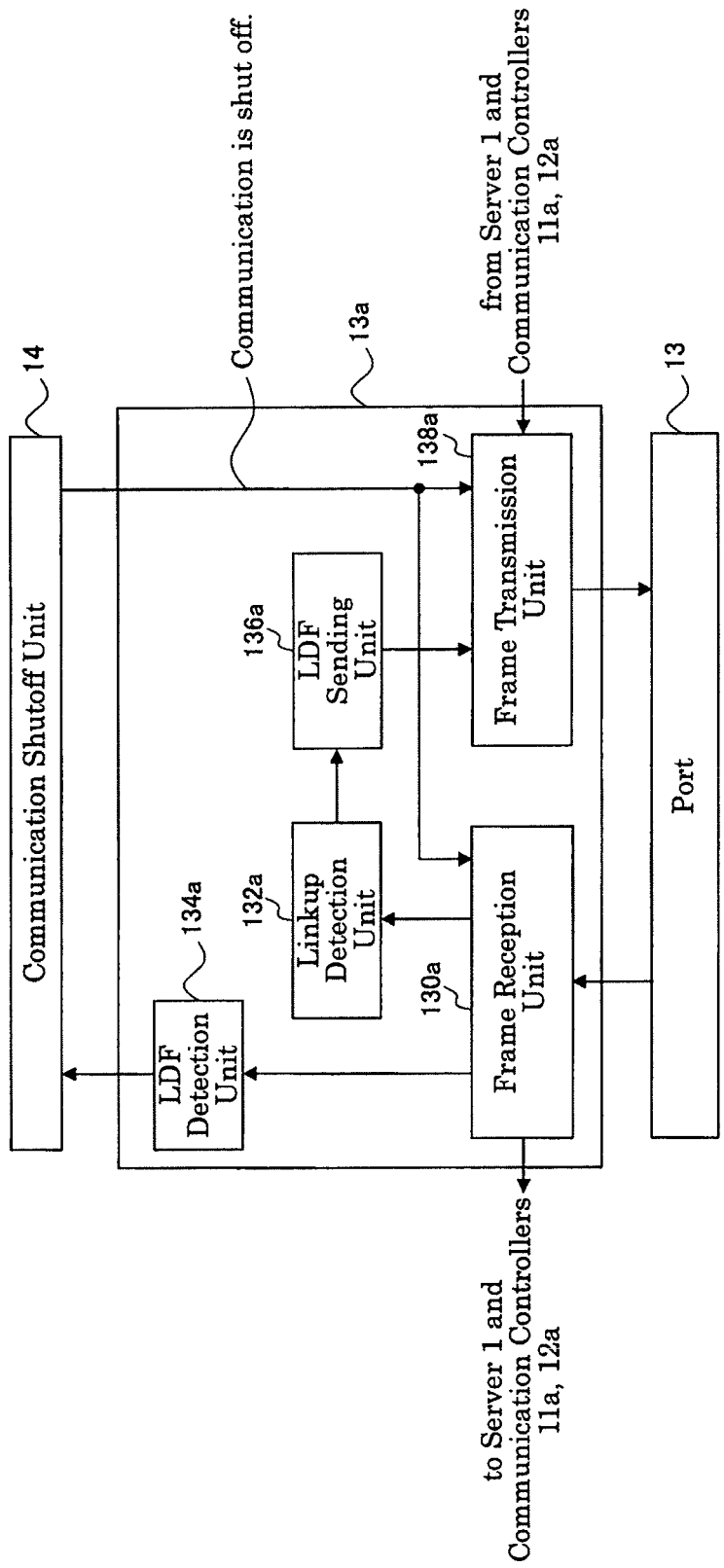
FIG. 5 is a functional block diagram showing a configuration of the communication controller 13a included by the switch 10 according to the embodiment of the present invention.

FIG. 5 is a functional block diagram showing a configuration of the communication controller 13*a* included by the switch 10 according to the embodiment of the present invention.

The communication controller 13*a* includes a frame reception unit 130*a*, a linkup detection unit 132*a*, a loop detection frame detection unit 134*a*, a loop detection frame sending unit 136*a*, and a frame transmission unit 138*a*.

The frame reception unit 130*a*, the linkup detection unit 132*a*, the loop detection frame detection unit 134*a*, the loop detection frame sending unit 136*a*, and the frame transmission unit 138*a* are respectively the same as the frame reception unit 110*a*, the linkup detection unit 112*a*, the loop detection frame detection unit 114*a*, the loop detection frame sending unit 116*a*, and the frame transmission unit 118*a*.

It should be noted that the frame reception unit 130*a*, the linkup detection unit 132*a*, the loop detection frame detection unit 134*a*, the loop detection frame sending unit 136*a*, and the frame transmission unit 138*a* carry out processing relating to the port 13, which is a point different from the frame reception unit 110*a*, the linkup detection unit 112*a*, the loop detection frame detection unit 114*a*, the loop detection frame sending unit 116*a*, and the frame transmission unit 118*a* which carry out processing relating to the port 11.

Moreover, if a destination of the frame is the communication controller 11*a*, the frame reception unit 130*a* forwards the frame toward the communication controller 11*a*. For example, if the frame reception unit 130*a* receives a broadcasted frame via the port 13, the frame reception unit 130*a* forwards the frame toward the server 1, the communication controller 11*a*, and the communication controller 12*a*.

Further, the frame transmission unit 138*a* transmits a frame (such as a loop detection frame) via the port 13. It should be noted that if the frame transmission unit 138*a* receives a frame from the server 1, the communication controller 11*a*, and the communication controller 12*a*, the frame transmission unit 138*a* transmits the frame via the port 13.

The communication shutoff unit 14 receives the sending port from the loop detection frame detection unit 134*a*, and shuts off the communication via the sending port. If the port 13 is a sending port, the reception by the frame reception unit 130*a* is stopped, and, simultaneously, the transmission by the frame transmission unit 138*a* is also stopped. It should be noted that the stop of the reception by the frame reception unit 130*a* includes a case in which a frame is received by the frame reception unit 130*a*, but the frame is discarded.

A description will now be given of an operation of the embodiment of the present invention.

Figure 6:
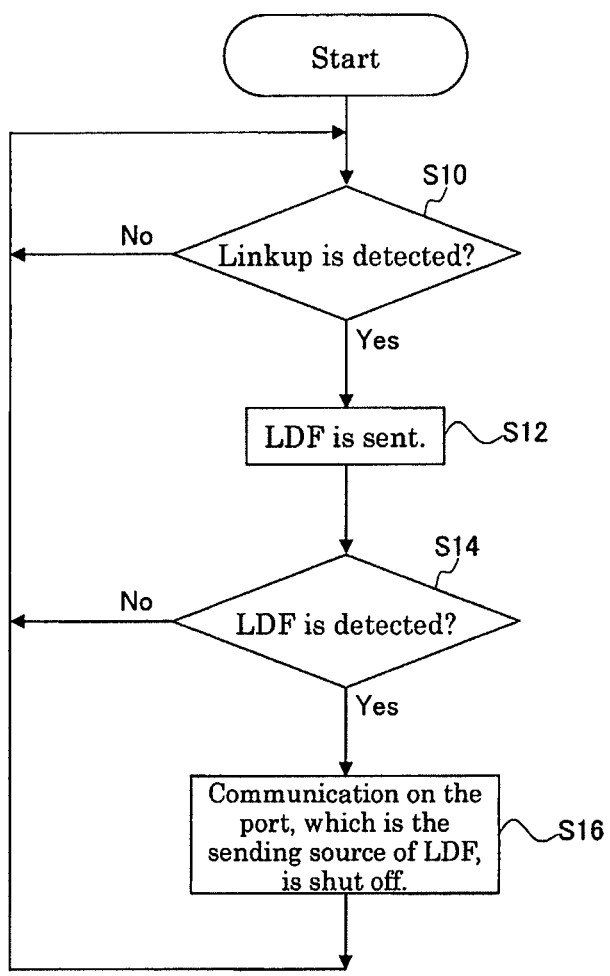
FIG. 6 is a flowchart showing an operation of the switch 10 according to the embodiment of the present invention.
Figure 7:
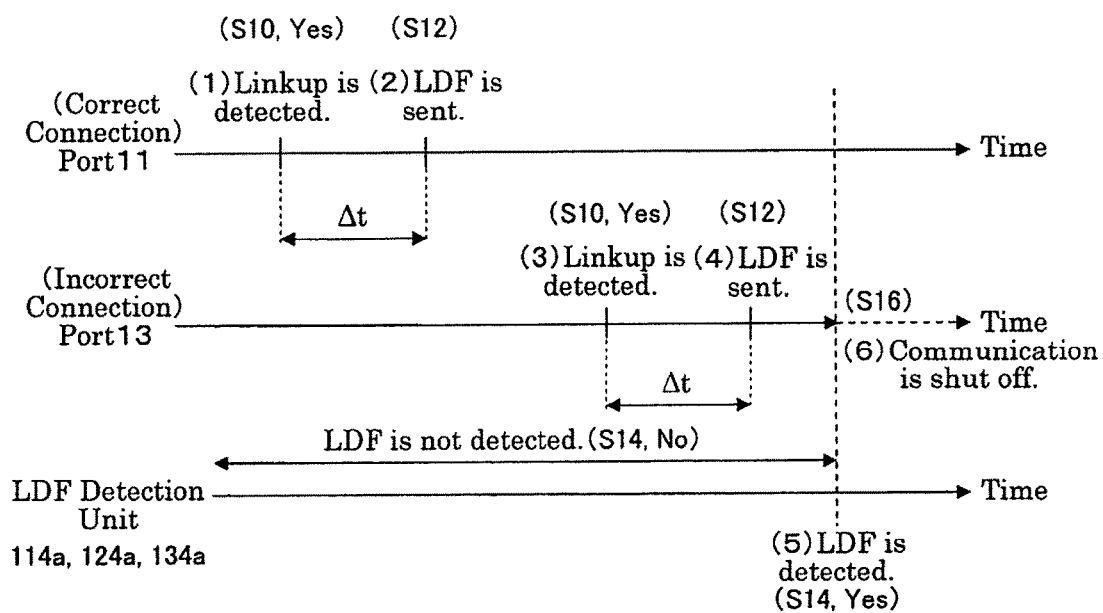
FIG. 7 is a diagram showing timings of the operation of the switch 10 according to the embodiment of the present invention.
Figure 8:
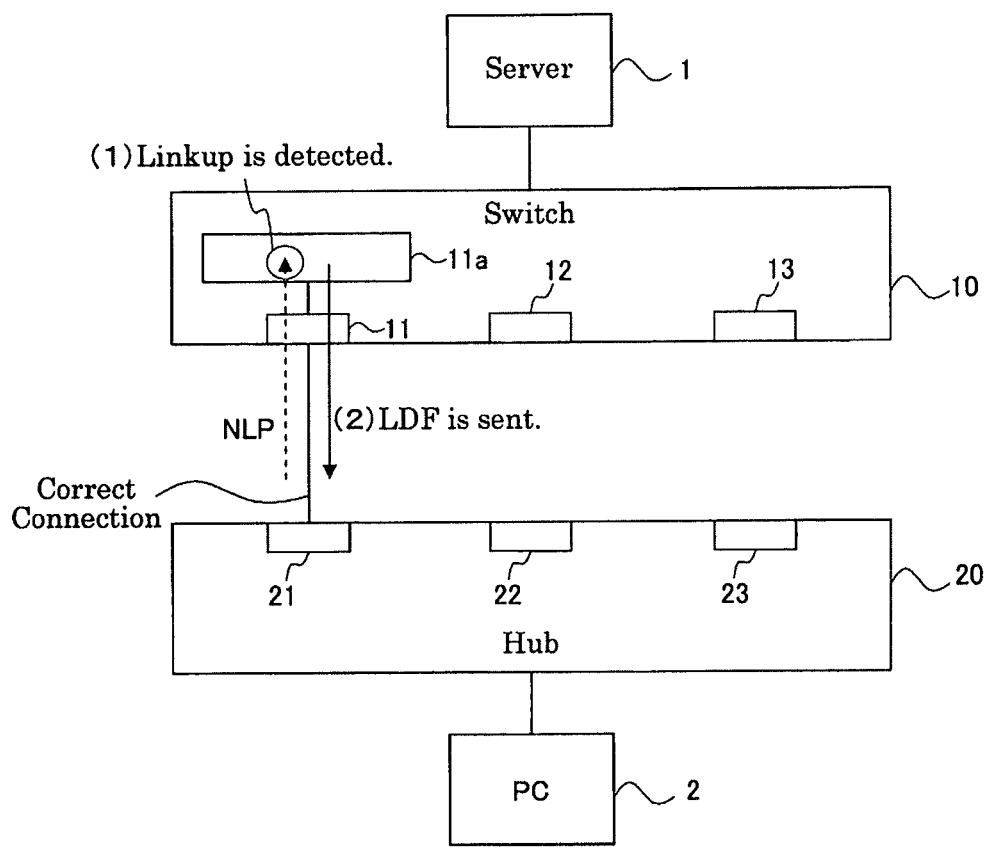
FIG. 8 is a diagram showing an operation of the switch 10 if the switch 10 according to the embodiment of the present invention is correctly connected to the hub 20.
Figure 9:
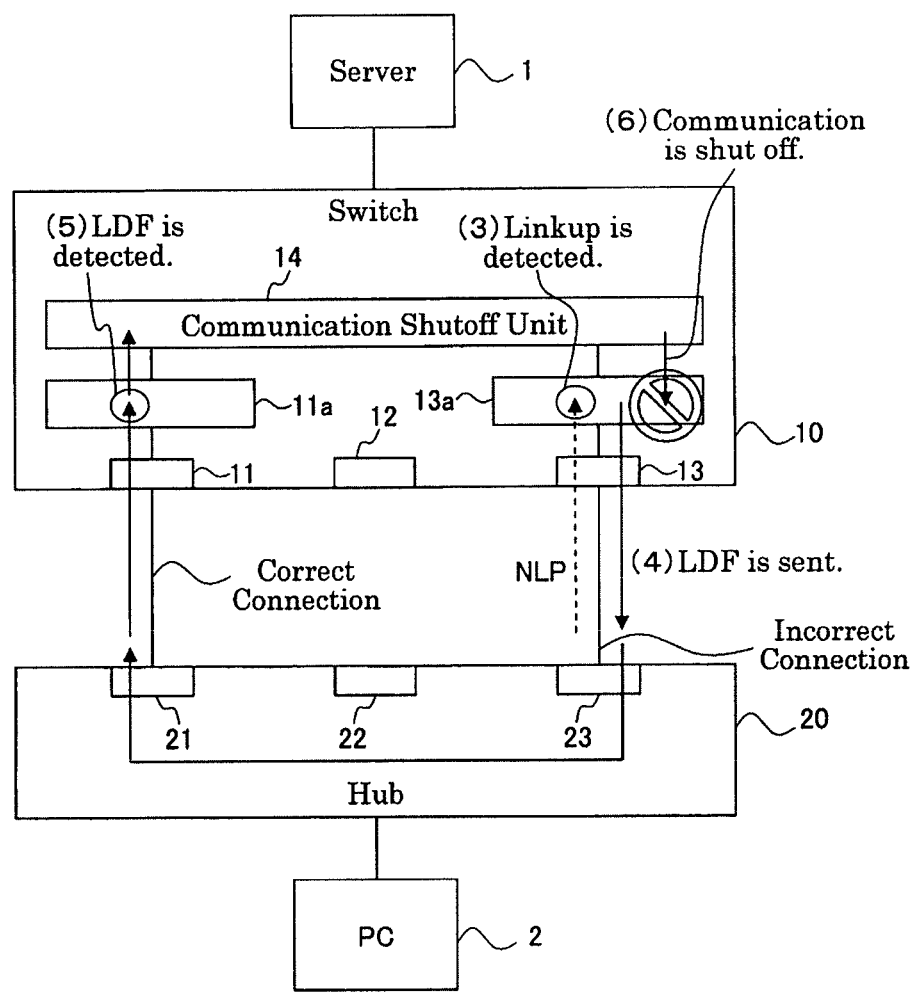
FIG. 9 is a diagram showing an operation of the switch 10 if the switch 10 according to the embodiment of the present invention is incorrectly connected to the hub 20.

FIG. 6 is a flowchart showing an operation of the switch 10 according to the embodiment of the present invention. FIG. 7 is a diagram showing timings of the operation of the switch 10 according to the embodiment of the present invention. FIG. 8 is a diagram showing an operation of the switch 10 if the switch 10 according to the embodiment of the present invention is correctly connected to the hub 20. FIG. 9 is a diagram showing an operation of the switch 10 if the switch 10 according to the embodiment of the present invention is incorrectly connected to the hub 20.

A description is given of the operation of the embodiment of the present invention after the correct connection is made as shown in FIG. 8 until the incorrect connection is made as shown in FIG. 9 with reference to FIGS. 6 and 7.

Referring to FIG. 6, the linkup detection units 112*a*, 122*a*, and 132*a* wait until the ports 11, 12, and 13 are linked up (No in S10). When the port 11, 12, or 13 is linked up, the linkup detection unit 112*a*, 122*a*, or 132*a* detects the linkup (Yes in S10).

When a predetermined period Δt has elapsed after the linkup detection, the loop detection frame sending unit 116*a*, 126*a*, or 136*a* to which the linkup detection unit 112*a*, 122*a*, or 132*a*, which has detected the linkup, is connected sends a loop detection frame LDF via the frame transmission unit 118*a*, 128*a*, or 138*a* from the port 11, 12, or 13, which is the linkup detected port (S12).

The loop detection frame sending units 116*a*, 126*a*, and 136*a* wait until detection of the loop detection frame LDF (No in S14).

For example, as shown in FIG. 8, the port 11 of the switch 10 and the port 21 of the hub 20 are correctly connected with each other. Then, a normal link pulse NLP is transmitted from the port 21 of the hub 20 to the port 11 of the switch 10. The normal link pulse NLP is detected by the linkup detection unit 112*a* of the communication controller 11*a* (refer to "Yes in S10" in FIG. 6). Refer to "(1) Linkup is detected" in FIGS. 7 and 8. In this case, the port 11 is the linkup detected port.

When the predetermined period Δt has elapsed after the linkup detection, the loop detection frame sending unit 116*a* to which the linkup detection unit 112*a*, which has detected the linkup in the communication controller 11*a*, is connected sends the loop detection frame LDF via the frame transmission unit 118*a* from the port 11, which is the linkup detected port (refer to "S12" in FIG. 6). Refer to "(2) LDF is sent" in FIGS. 7 and 8.

It should be noted that the predetermined period Δt may be set by a user of the switch 10. It should be noted that the predetermined period Δt may be fixed when the switch 10 is delivered.

Referring to FIG. 8, even if the loop detection frame LDF is sent, the loop detection frame LDF will not return from the hub 20 to the switch 10, and the loop detection frame sending units 116*a*, 126*a*, and 136*a* will not detect the loop detection frame LDF ("No in S14" in FIG. 6). Refer to "LDF is not detected (No in S14)" in FIG. 7.

Returning to FIG. 6, if the loop detection frame sending unit 116*a*, 126*a*, or 136*a* detects the loop detection frame LDF (Yes in S14), the loop detection frame sending unit 116*a*, 126*a*, or 136*a* reads the sending port from the loop detection frame LDF, and provides the sending port to the communication shutoff unit 14. The communication shutoff unit 14 shuts off the communication by the sending port (S16). As a result, the loop is dissolved.

For example, in the state of the correct connection as shown in FIG. 8, it is assumed that the port 13 of the switch 10 and the port 23 of the hub 20 are incorrectly connected with each other (referred to as "incorrect connection"). An operation of the switch 10 for the incorrect connection is shown in FIG. 9.

Then, referring to FIG. 9, the normal link pulse NLP is transmitted from the port 23 of the hub 20 to the port 13 of the switch 10. The normal link pulse NLP is detected by the linkup detection unit 132a of the communication controller 13a (refer to "Yes in S10" in FIG. 6). Refer to "(3) Linkup is detected" in FIGS. 7 and 9. In this case, the port 13 is the linkup detected port.

When the predetermined period Δt has elapsed after the linkup detection, the loop detection frame sending unit 136a to which the linkup detection unit 132a, which has detected the linkup in the communication controller 13a, is connected sends the loop detection frame LDF via the frame transmission unit 138a from the port 13, which is the linkup detected port (refer to "S12" in FIG. 6). Refer to "(4) LDF is sent" in FIGS. 7 and 9. The port 13 is recorded as the sending port in this loop detection frame LDF.

It should be noted that the predetermined period Δt may be set by the user of the switch 10 as described before. It should be noted that the predetermined period Δt may be fixed when the switch 10 is delivered.

Referring to FIG. 9, when the loop detection frame LDF is sent from the port 13, the loop detection frame LDF is output via the port 23 and the hub 20 from the port 21. Further, the loop detection frame LDF output from the port 21 of the hub 20 is received on the port 11 of the switch 10. Thus, the loop detection frame LDF is detected by the loop detection frame detection unit 114a of the communication controller 11a (refer to "Yes in S14" in FIG. 6). Refer to "(5) LDF is detected" in FIGS. 7 and 9.

The loop detection frame detection unit 114a reads the content that the sending port is the port 13 from the loop detection frame, and provides the content to the communication shutoff unit 14. The communication shutoff unit 14 shuts off the communication by the port 13 (refer to "S16" in FIG. 6). In other words, the communication shutoff unit 14 stops the reception by the frame reception unit 130a of the communication controller 13a, and simultaneously stops the transmission by the frame transmission unit 138a of the communication controller 13a. Refer to "(6) Communication is shut off" in FIGS. 7 and 9.

If the connection between the ports 11 and 21, and the connection between the ports 13 and 23 are left, the loop is generated, which interferes the communication. However, the loop is dissolved by shutting off the communication on the port 13.

According to the embodiment of the present invention, the communication shutoff unit 14 shuts off the communication on the port 13, and the loop is thus dissolved. Moreover, the port the communication by which is shut off upon the loop dissolution is not the port 11 relating to the correct connection, but the port 13 relating to the incorrect connection. Therefore, upon the loop dissolution, the server 1 and the PC 2 can communicate with each other via the port 11 of the switch 10 and the port 21 of the hub 20 which are correctly connected with each other.

In other words, as shown in FIG. 8, for the correct connection (connection between the ports 11 and 21), the switch 10 will not detect the loop detection frame LDF. On the other hand, as shown in FIG. 9, the incorrect connection (connection between the ports 13 and 23) is further made, the loop detection frame LDF sent from the port 13 relating to the incorrect connection (refer to "(4) LDF is sent" in FIG. 9) is detected by the loop detection frame detection unit 114a of the communication controller 11a of the switch 10 (refer to "(5) LDF is detected" in FIG. 9). Thus, the communication by the incorrect connection can be shut off by shutting off the communication on the port 13, which is the sending source of the detected loop detection frame LDF (refer to "(6) Communication is shut off" in FIG. 9). On this occasion, it should be noted that the communication on the port 11 relating to the correct connection is not shut off.

If the communication on the port 11 relating to the correct connection is shut off, the communication between the switch 10 and the hub 20 is carried out via the port 13 relating to the incorrect connection. However, setting for the communication on the port 13 connected incorrectly may be different from setting for the communication on the port 11 connected correctly. Therefore, the communication via the port 13 is not guaranteed.

However, according to the embodiment of the present invention, the communication on the port 11 relating to the correct connection is not shut off, the communication on the port 13 relating to the incorrect connection is shut off, and the communication between the server 1 and the PC 2 via the correct connection (ports 11 and 21) can be continued.

The above-mentioned effect is provided by the sending of the loop detection frame LDF triggered by the linkup detection. The above-mentioned effect cannot be provided only by periodically sending the loop detection frame LDF. It should be noted that such a case of setting the predetermined period Δt to 0 is conceivable.

It should be noted that after the linkup is detected, until the loop detection frame LDF is detected, the communication on the linkup detected port is not shut off.

It should be noted that the following modified examples of the embodiment of the present invention are conceivable.

Figure 10:
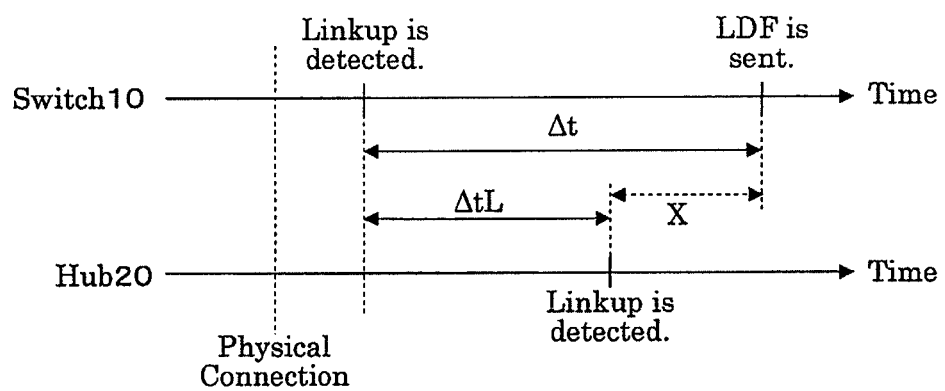
FIG. 10 is a diagram showing a preferred example of the predetermined period $\Delta t$.
Figure 11A:
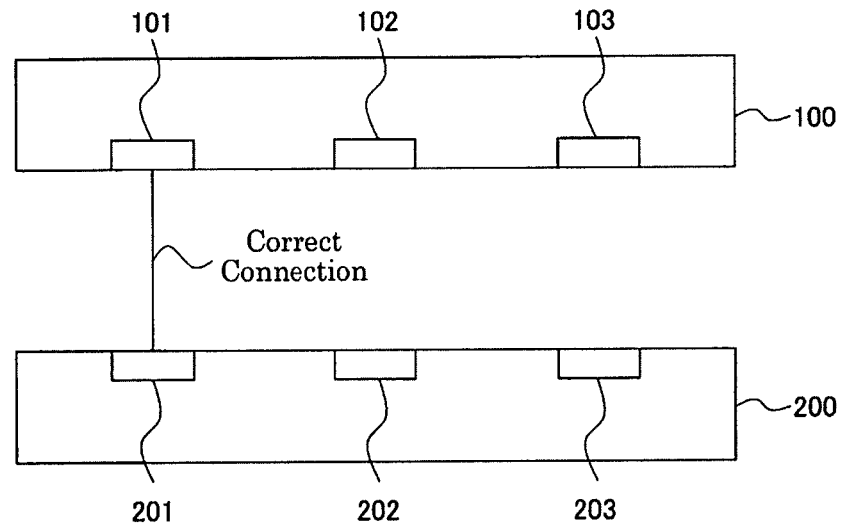
FIGS. 11(a) and 11(b) are diagrams showing an example of a network configuration in which a loop is generated according to prior art, and showing an example (FIG. 11(a)) of the network configuration before a loop is generated and an example (FIG. 11(b)) of the network configuration after the loop is generated.
Figure 11B:
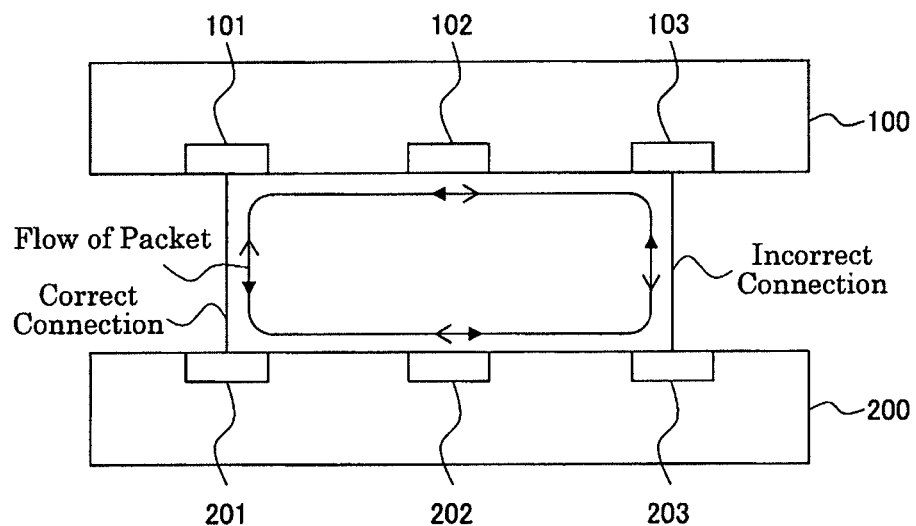
Figure 12A:
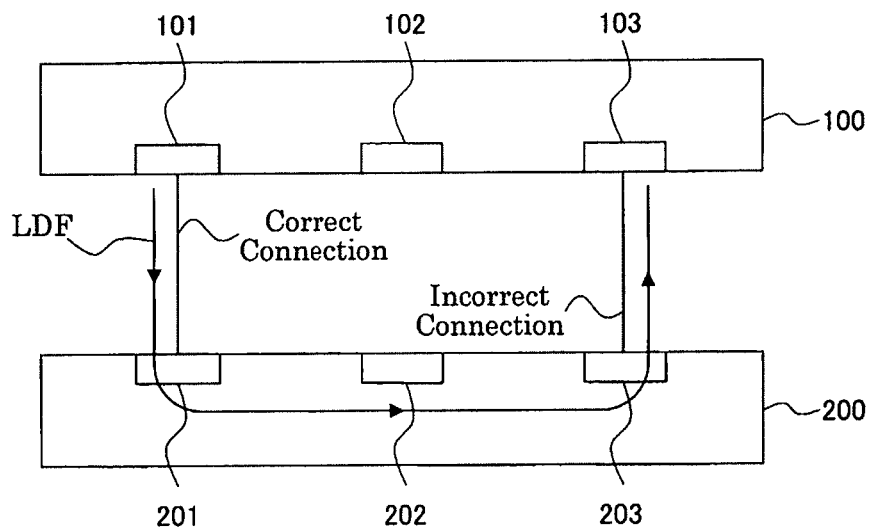
FIGS. 12(a) and 12(b) are diagrams showing a detection principle of a loop by means of the LDF according to prior art, and shows a case in which the LDF is output from the port 101 (FIG. 12(a)), and a case in which the LDF is output from the port 103 (FIG. 12(b)).
Figure 12B:
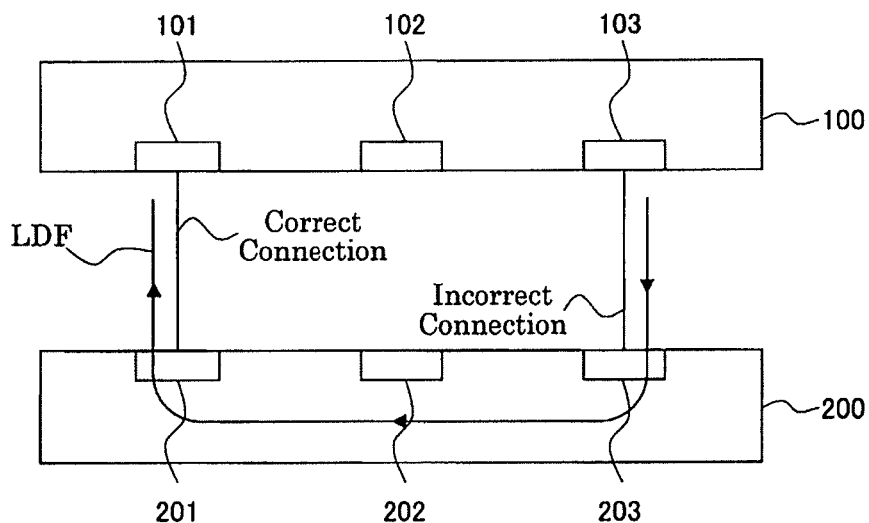

FIG. 10 is a diagram showing a preferred example of the predetermined period Δt.

The predetermined period Δt (refer to FIG. 7) is preferably longer than a difference ΔtL between the period required for detecting the linkup by the switch 10 and the period required for detecting the linkup by the hub 20. For example, it is conceivable to set Δt to 0.5 second. It should be noted that the period required for detecting the linkup is a period from a physical connection via a communication cable until the detection of the linkup.

In general, the switch 10 can carry out data processing at a higher speed than the hub 20, and the detection of the linkup by the switch 10 is finished earlier than the detection of the linkup by the hub 20. Moreover, communication on a certain port (such as the port 23) may be configured to be shut off until the linkup is detected for this port in the hub 20.

If the loop detection frame LDF is sent immediately after the linkup on the port 13 is detected by the switch 10, there may be generated such a state that the hub 20 may have not detected the linkup on the port 23. Then, the hub 20 shuts off the loop detection frame LDF transmitted toward the port 23, and the switch 10 cannot detect the loop detection frame LDF. In this state, although the connection is incorrect, the communication is not shut off, and the loop cannot be dissolved.

Thus, the loop detection frame LDF is preferably sent after the detection of the linkup by the hub 20. The predetermined period Δt (refer to FIG. 7) is preferably longer than the difference ΔtL between the period required for detecting the linkup by the switch 10 and the period required for detecting the linkup by the hub 20.

It should be noted that the communication is available after the detection of the linkup in the switch 10 and the hub 20. In this case, a loop may be formed in a period X (refer to FIG. 10) after the linkup is detected in the hub 20 until the loop detection frame LDF is sent from the switch 10. If the loop is formed, broadcast frames are transmitted and received between the switch 10 and the hub 20, and the period X is long enough, a broadcast storm may be generated. If a broadcast storm is generated, the switch 10 may not detect the loop detection frame LDF. In this case, the communication on the port 13 relating to the incorrect connection cannot be shut off, and the loop cannot be dissolved.

Thus, if the communication on the linkup detected port is shut off in the period X, the broadcast storm as described above can be prevented from being generated. For example, if, in the hub 20, the communication on the linkup detected port is shut off before the detection of the linkup until the sending of the loop detection frame LDF from the switch 10, the broadcast storm as described above can be prevented from being generated.

For example, if the communication on the linkup detected port is shut off after the linkup is detected in the switch 10 until the loop detection frame LDF is sent from the switch 10, the broadcast storm as described above can be prevented from being generated.

It should be noted that the period "before the linkup is detected in the hub 20" includes a time point when the linkup is detected in the hub 20.

As described above, it should be noted that even if the communication on the linkup detected port is shut off in a period including the period X, the communication on the linkup detected port is not shut off after the loop detection frame LDF is sent until the loop detection frame LDF is detected.

Moreover, it is conceivable to record the sending port (port 13) in the switch 10 in place of the loop detection frame LDF. For example, it is conceivable to record a sending time point and the sending port of the loop detection frame LDF in the switch 10. If the switch 10 detects the loop detection frame LDF, it should be only necessary to shut off the communication on the sending port of the loop detection frame LDF at a last sending time point before a time point when the loop detection frame LDF is detected.

Moreover, the above-described embodiment may be realized in the following manner. A computer is provided with a CPU, a hard disk, and a media (such as a floppy (registered trade mark) disk and a CD-ROM) reader, and the media reader is caused to read a medium recording a program realizing the above-described respective components such as the respective components of the switch 10, thereby installing the program on the hard disk. This method may also realize the above-described functions.

What is claimed is:

1. A network device including a plurality of ports, the network device comprising:
   a processor that controls communication on each; of the plurality of ports and that shuts off communication on any of the plurality of ports; and
   a memory including instructions that, when executed by the processor, cause the processor to perform operations including:
   detecting a linkup of one of the plurality of ports;
   sending a loop detection frame from a linkup detected port, which is the one of the plurality of ports for which the linkup is detected, after a predetermined period from a time point when the linkup is detected;
   detecting the loop detection frame when the loop detection frame is received on any of the plurality of ports other than the linkup detected port; and
   shutting off communication carried out on a sending port which is the linkup detected port from which the loop detection frame is sent, when the loop detection frame is detected.

2. The network device according to claim 1, wherein the predetermined period is configured to be set by a user of the network device.

3. The network device according to claim 1, wherein the predetermined period is 0.

4. The network device according to claim 1, wherein:
   another network device is connected to the network device; and
   the predetermined period is longer than a difference between a period required for detecting the linkup of the network device and a period required for detecting a linkup of the other network device.

5. The network device according to claim 4, wherein the communication on the linkup detected port is shut off from a time point before the linkup is detected on the other network device until the loop detection frame is sent from the network device.

6. The network device according to claim 5, wherein the communication on the linkup detected port is shut off from the time point when the linkup is detected on the network device until the loop detection frame is sent from the network device.

7. The network device according to claim 1, wherein the sending port is recorded in the loop detection frame, and
   the sending port, which is recorded in the loop detection frame, is read by the processor.

8. The network device according to claim 1, wherein the sending port is recorded in the network device, and
   the sending port, which is recorded in the network device, is read by the processor.

9. A communication method for a network device having a plurality of ports, a processor controlling communication on each of the plurality of ports and shutting off communication on any of the plurality of ports, the communication method comprising:
   detecting a linkup of one of the plurality of ports;
   sending a loop detection frame from a linkup detected port, which is the one of the plurality of ports for which the linkup is detected after a predetermined period from a time point when the linkup is detected;
   detecting the loop detection frame when the loop detection frame is received on any of the plurality of ports other than the linkup detected port; and
   shutting off communication carried out on a sending port, which is the linkup detected port from which the loop detection frame is sent, when the loop detection frame is detected.

10. A non-transitory computer-readable medium having a program of instructions for execution by a computer to perform a communication process for a network device having a plurality of ports, the computer controlling communication on each of the plurality of ports and shutting off communication on any of the plurality of ports, the instructions, when executed, causing the computer to perform operations comprising:

detecting a linkup of one of the plurality of ports;
sending a loop detection frame from a linkup detected port, which is the one of the plurality of ports for which the linkup is detected after a predetermined period from a time point when the linkup is detected;
detecting the loop detection frame when the loop detection frame is received on any of the plurality of ports other than the linkup detected port; and
shutting off communication carried out on a sending port which is the linkup detected port from which the loop detection frame is sent, when the loop detection frame is detected.

\* \* \* \* \*

UNITED STATES PATENT AND TRADEMARK OFFICE
CERTIFICATE OF CORRECTION

PATENT NO. : 9,762,477 B2
APPLICATION NO. : 14/741945
DATED : September 12, 2017
INVENTOR(S) : T. Ikegami It is certified that error appears in the above-identified patent and that said Letters Patent is hereby corrected as shown below:

In the Claims

Column 12, Line 51 (Claim 9, Line 9) please change "detected after" to --detected, after--
Column 13, Line 4 (Claim 10, Line 12) please change "detected after" to --detected, after--
Column 13, Lines 9-10 (Claim 10, Lines 17-18) please change "port which" to --port, which--

Signed and Sealed this
Twentieth Day of February, 2018

Andrei Iancu
*Director of the United States Patent and Trademark Office*